US007127394B2

(12) United States Patent
Strong

(10) Patent No.: US 7,127,394 B2
(45) Date of Patent: *Oct. 24, 2006

(54) ASSIGNING MEANINGS TO UTTERANCES IN A SPEECH RECOGNITION SYSTEM

(75) Inventor: Robert Don Strong, San Jose, CA (US)

(73) Assignee: Apple Computer, Inc., Cupertino, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 10/781,998

(22) Filed: Feb. 18, 2004

(65) Prior Publication Data

US 2004/0162729 A1 Aug. 19, 2004

Related U.S. Application Data

(63) Continuation of application No. 09/977,520, filed on Oct. 12, 2001, now Pat. No. 6,704,710, which is a continuation of application No. 07/999,016, filed on Dec. 31, 1992, now Pat. No. 6,311,157.

(51) Int. Cl.
  *G10L 15/18* (2006.01)
(52) U.S. Cl. .................... 704/255; 704/257
(58) Field of Classification Search ............... None
  See application file for complete search history.

(56) References Cited

U.S. PATENT DOCUMENTS

| 4,618,984 A | 10/1986 | Das et al. ............... 381/43 |
| 4,827,520 A | 5/1989 | Zeinstra ................. 381/43 |
| 4,994,983 A | 2/1991 | Landell et al. .......... 364/513 |
| 5,027,406 A | 6/1991 | Roberts et al. .......... 381/43 |
| 5,033,087 A | 7/1991 | Bahl et al. .............. 381/43 |
| 5,046,099 A | 9/1991 | Nishimura ............... 381/43 |
| 5,315,689 A | 5/1994 | Kanazawa et al. ....... 395/2.47 |
| 5,384,892 A * | 1/1995 | Strong ................... 704/243 |
| 5,390,279 A * | 2/1995 | Strong ................... 704/200 |
| 5,613,036 A * | 3/1997 | Strong ................... 704/243 |
| 6,311,157 B1 * | 10/2001 | Strong ................... 704/255 |

(Continued)

FOREIGN PATENT DOCUMENTS

EP 0293259 11/1988

(Continued)

OTHER PUBLICATIONS

Mountford, S. Joy, et al. *The Art of Human-Computer Interface Design* "Talking and Listening to Computers", pp. 310-334, Addison-Wesley Publishing Co., Inc. Reading, MA (1990).

(Continued)

*Primary Examiner*—Susan McFadden
(74) *Attorney, Agent, or Firm*—Blakely, Sokoloff, Taylor & Zafman LLP

(57) ABSTRACT

Assigning meanings to spoken utterances in a speech recognition system. A plurality of speech rules is generated, each of the of speech rules comprising a language model and an expression associated with the language model. At one interval (e.g. upon the detection of speech in the system), a current language model is generated from each language model in the speech rules for use by a recognizer. When a sequence of words is received from the recognizer, a set of speech rules which match the sequence of words received from the recognizer is determined. Each expression associated with the language model in each of the set of speech rules is evaluated, and actions are performed in the system according to the expressions associated with each language model in the set of speech rules.

29 Claims, 16 Drawing Sheets

U.S. PATENT DOCUMENTS 6,704,710 B1 * 3/2004 Strong .................. 704/255

FOREIGN PATENT DOCUMENTS

EP 0299572 1/1989
EP 0327408 6/1989

OTHER PUBLICATIONS

"Speech Editor", IBM Technical Disclosure Bulletin, vol. 29 No. 10, Mar. 1987; pp. 4512-4514.

Alan Roskiewicz, "BackTalk: Lip Service," *A+ Magazine*, pp. 60-61 (Feb. 1984).*

Schmanat et al., "Augmenting a Window System With Speech Input," *Computers*, Aug. 1790, 23(8):50-56.*

"Integrated Avne—Graphics User Interface," IBM Technical Disclosure Papers, 1991, 33(11):365-71.*

Holmes, *Speech System and Research,* Chapman-Hall, London, UK, 1955, pp. 129-135, 152-153.*

International Conference on Acoustics, Speech and Signal Processing 90, vol. 1, Apr. 3, 1990, pp. 573-576, Murveit et al., "Integrated Natural Language Constraints into HMM-based Speech Recognition".

Computer, vol. 24, No. 6, Jun. 1992, pp. 36-50, Kitano, "PhiDM-Dialog".

IBM Technical Disclosure Bulletin, vol. 34, No. 1, Jun. 1991, "Speech Recognition with Hidden Markov Models of Speech Waveforms".

Kai-Fu Lee, *Large-Vocabulary Speaker-Independent Continuous Speech Recognition: The SPHINX System,* Apr. 18, 1988 (submitted for fulfillment of requirements for Ph.D. at Carnegie Mellon University).

* cited by examiner

025 # ASSIGNING MEANINGS TO UTTERANCES IN A SPEECH RECOGNITION SYSTEM

This application is a continuation application of U.S. patent application Ser. No. 09/977,520, filed Oct. 12, 2001 now U.S. Pat. No. 6,704,710, which is a continuation application of U.S. patent application Ser. No. 07/999,016, filed Dec. 31, 1992, now U.S. Pat. No. 6,311,157

BACKGROUND OF THE INVENTION

1. Field of the Invention

The present invention relates to speech recognition systems. More specifically, this invention relates to the generation of language model(s) and the interpretation of speech based upon specified sets of these language model(s).

2. Background of Related Art

To increase the utility of computer systems, many manufacturers have been seeking to achieve the goal of speaker independent speech recognition. This technology would allow the computer system to be able to recognize and respond to words spoken by virtually anyone who uses it. Unfortunately, the performance of processors in personal computer systems and the techniques used to implement the technology have been typically inadequate for handling the complexity of such speech recognition tasks.

One problem is simply the complexity of the algorithms used for speech recognition. Even the fastest personal computers have difficulty performing all of the computation required for speech recognition in real time (the time it takes for a human to speak the utterance being recognized), so that there is a noticeable delay between the time the user has finished speaking and the time the computer generates a response. If that time delay is too large, the usefulness and acceptance of the computer system will be greatly diminished.

Another problem with speech recognition systems is accuracy. In general, as the number of utterances that a speech recognition system is programmed to recognize increases, the computation required to perform that recognition also increases, and the accuracy with which it distinguishes among those utterances decreases.

One problem is due to the large vocabulary required for interpreting spoken commands. These tasks will typically require a search of the entire vocabulary in order to determine the words being spoken. For example, this vocabulary may comprise all the words in a specified language, including any specialized words. Such vocabularies must also include plurals, all conjugations of verbs (regular and irregular), among other items, creating a very large vocabulary to be recognized. This requires a very large database search. It also mandates the use of very high performance search capabilities by using a high performance processor, or the use of a special search techniques. Even assuming all these things, typical prior art search techniques and processors have been inadequate for full "natural language" speech recognition, that is, recognizing speech in a manner in which people normally speak to each other. It is desirable to provide a system which provides some natural language capabilities (e.g., allowing people to speak in a manner in which they might normally speak) but yet avoid the overhead associated with full natural language systems.

Another problem posed by speech recognition systems is the dynamic adding of additional words to the vocabulary that may be recognized depending on data contained within the computer. In other words, prior art speech recognition systems have not provided a means for recognizing additional words which have pronunciations which are unknown to the system.

Another prior art problem posed by speech recognition systems is the transformation of the spoken commands being recognized into data to be used by the system, or actions to be performed. For example, a person may speak a date as a sequence of many words such as "the third Friday of next month", while the computer system requires a specific numeric representation of that date, e.g., the number of seconds since Jan. 1, 1900. In summary, prior art speech recognition systems suffer from many deficiencies that prohibit incorporating such technology into non-dedicated devices such as a personal computer.

SUMMARY AND OBJECTS OF THE INVENTION

One of the objects of the present invention is to provide a means for associating meanings with spoken utterances in a speech recognition system.

Another of the objects of the present invention is to provide an improved method for associating expressions (e.g. actions and variable values) to speech rules in a speech recognition system.

These and other objects of the present invention are provided for by a method and apparatus for assigning meanings to spoken utterances in a speech recognition system. A plurality of speech rules is generated, each of the speech rules comprising a language model and an expression associated with the language model. Upon the detection of speech in the speech recognition system, a current language model is generated from each language model in the speech rules for use by a recognizer. When a sequence of words is received from the recognizer, a set of speech rules which match the sequence of words received from the recognizer is determined. Each expression associated with the language model in each of the set of speech rules is evaluated, and actions performed in the system according to the expressions associated with each language model in the set of speech rules. In various embodiments, language models may reference other language models which also have associated expressions. Each of the expressions for referenced language models are evaluated first, and then the language models comprising the speech rules are evaluated. Thus, actions such as variable assignments and commands may be performed according to these speech rules.

BRIEF DESCRIPTION OF THE DRAWINGS

The present invention is illustrated by way of example and not limitation in the figures of the accompanying in which like references indicate like elements and in which.

DETAILED DESCRIPTION

Methods and apparatus for a speech recognition system are described. In the following description, for the purposes of explanation, specific systems, components, and operating conventions are set forth in order to provide a thorough understanding of the present invention. It will be apparent, however, to one skilled in the art that the present invention may be practiced without these specific details. In other instances, well-known systems and components are discussed but not shown in detail in order to not unnecessarily obscure the present invention.

Figure 1:
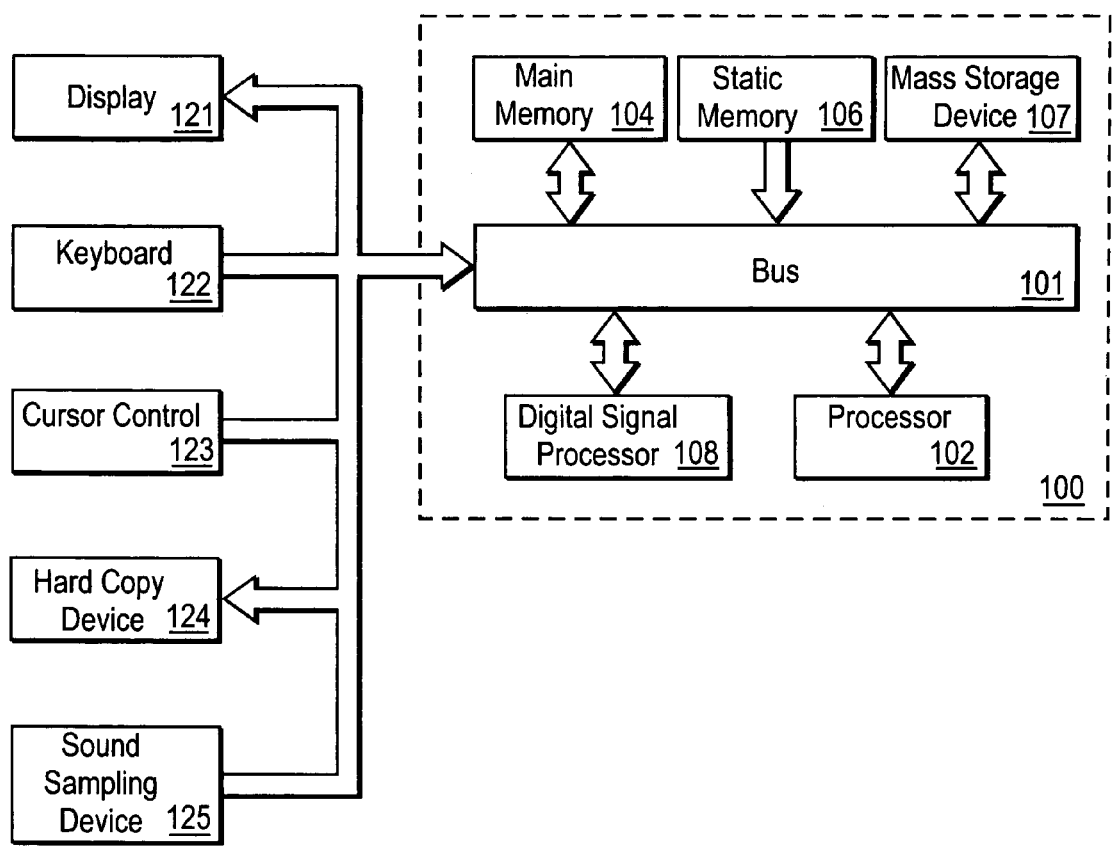
FIG. 1 shows a block diagram of a system upon which the preferred embodiment may be implemented.

Referring to FIG. 1, the computer system upon which the preferred embodiment of the present invention is implemented is shown as 100. 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102, and a mass data storage device 107 such as a magnetic disk or optical disk and its corresponding disk drive. Mass storage device 107 is coupled to bus 101 for storing information and instructions. 100 may further comprise a coprocessor or processors 108, such as a digital signal processor, for additional processing bandwidth. Computer system 100 may further be coupled to a display device 121, such as a cathode ray tube (CRT) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, or cursor direction keys, coupled to bus 101 for communicating direction information and command selections to processor 102, and for controlling cursor movement on display 121. Another device which may be coupled to bus 101 is hard copy device 124 which may be used for printing instructions, data, or other information on a medium such as paper, film, or similar types of media. System 100 may further be coupled to a sound sampling device 125 for digitizing sound signals and transmitting such digitized signals to processor 102 or digital signal processor 108 via bus 101. In this manner, sounds may be digitized and then recognized using processor 108 or 102.

In a preferred embodiment, system 100 is one of the Macintosh® brand family of personal computers available from Apple Computer, Inc. of Cupertino, Calif., such as various versions of the Macintosh® II, Quadra™, Performa™, etc. (Macintosh®, Apple®, Quadra, and Performa are trademarks of Apple Computer, Inc.). Processor 102 is one of the Motorola 680x0 family of processors available from Motorola, Inc. of Schaumburg, Ill., such as the 68020, 68030, or 68040. Processor 108, in a preferred embodiment, comprises one of the AT&T DSP 3210 series of digital signal processors available from American Telephone and Telegraph (AT&T) Microelectronics of Allentown, Pa. System 100, in a preferred embodiment, runs the Macintosh® brand operating system, also available from Apple Computer, Inc. of Cupertino, Calif.

Functional Overview

Figure 2:
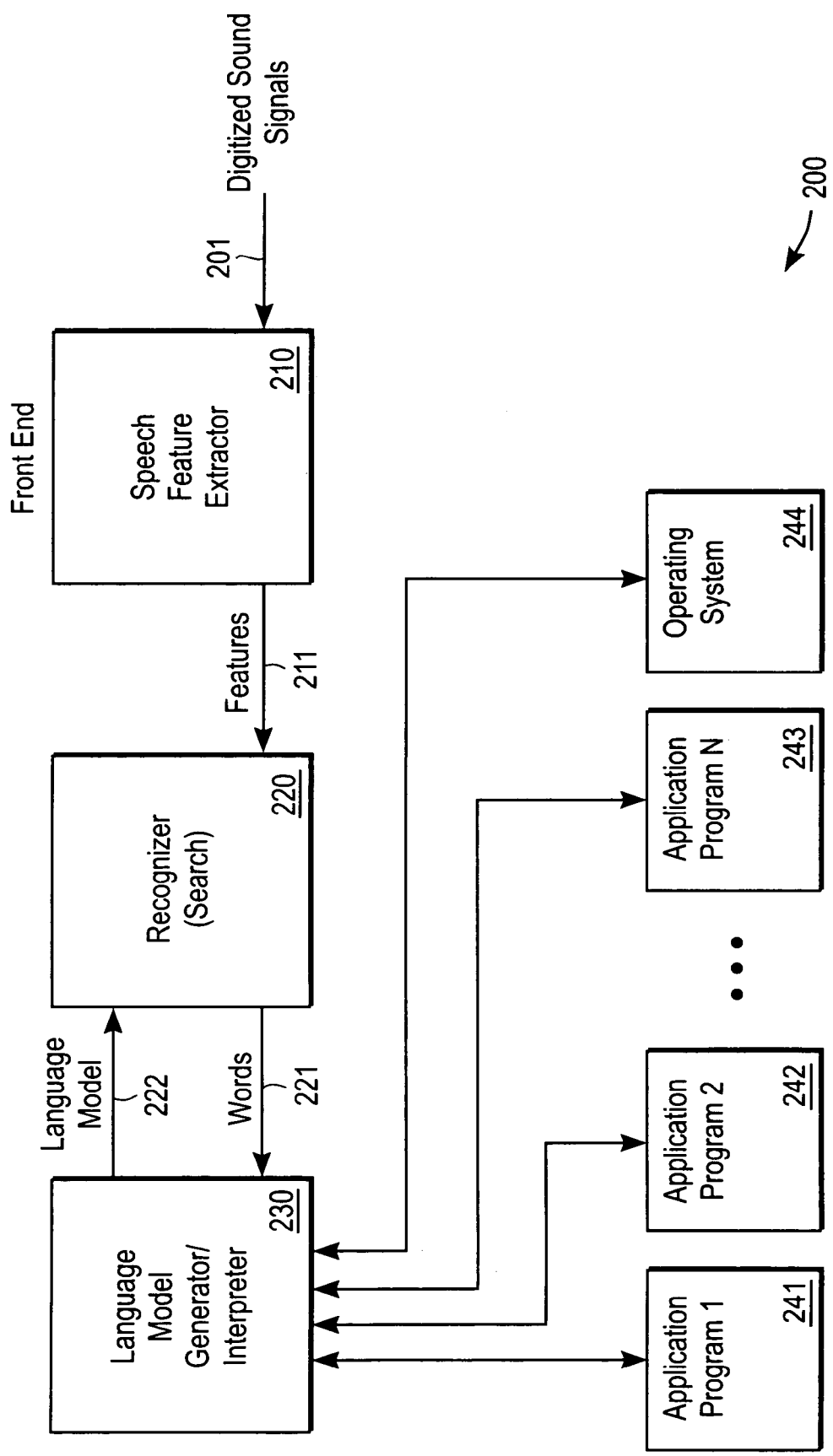
FIG. 2 shows the organization of the preferred embodiment as a functional block diagram.

The system of the preferred embodiment is implemented as a series of software routines which are run by processor 102 and which interact with data received from digital signal processor 108 via sound sampling device 125. It can be appreciated by one skilled in the art, however, that in an alternative embodiment, the present invention may be implemented in discrete hardware or firmware. The preferred embodiment is represented in the functional block diagram of FIG. 2 as 200. Digitized sound signals 201 are received from a sound sampling device such as 125 shown in FIG. 1, and are input to a circuit for speech feature extraction 210 which is otherwise known as the "front end" of the speech recognition system. The speech feature extraction process 210 is performed, in the preferred embodiment, by digital signal processor 108. This feature extraction process recognizes acoustic features of human speech, as distinguished from other sound signal information contained in digitized sound signals 201. In this manner, features such as phones or other discrete spoken speech units may be extracted, and analyzed to determine whether words are being spoken. Spurious noises such as background noises and user noises other than speech are ignored. These acoustic features from the speech feature extraction process 210 are input to a recognizer process 220 which performs a search in a database to determine whether the extracted features represent expected words in a vocabulary recognizable by the speech recognition system. The vocabulary or the words which recognizer 220 will identify are generated by another process known as a language model generator/interpreter 230. This process transmits information known as a language model 222 to recognizer 220 to define the scope of the recognizer's search. Recognizer 220 will therefore search only in the portion of the database (vocabulary) according to the language model information 222 which is extracted according to certain operating conditions of the system in which 200 is currently operating. In this manner, the bandwidth of the processor in which recognizer 220 runs may be conserved due to not searching through an entire vocabulary of possible words, but instead, be limited to a vocabulary which is defined by operating conditions and words already detected. This will be discussed in more detail below.

The language model generator/interpreter 230 determines, based upon the current operating conditions of system 100, sequences of words which are expected to be received by recognizer 220 in order to limit the scope of the vocabulary search. In other words, language model generator/interpreter 230 queries running application programs, such as 241, 242, etc., in order to determine each of these application programs' current contexts. In addition, the current state of operating system 244, is also used to determine items which will be in the language model. In sum, depending on which application programs are running, and the current operating state of the operating system 244, the language model generator/interpreter 230 transmits different language models to recognizer 220. This is known as "dynamic" language model generation.

Once language model generator 230 determines the current operating context, it computes the language model information 222 and transmits it as a sequence of signals to recognizer 220. Then, based on this language model information, recognizer 220 will determine what words may have been spoken as determined from the features 211 received from speech feature extractor 210. Features are combined in a variety of ways by recognizer 220 until complete words are determined from the features based on expected words as defined by language model 222. Then, recognizer 220 transmits recognized words 221 to the language model generator/interpreter process 230 for interpretation and performance of actions according to the interpretation of the transmitted words 221 by 230.

Figure 3:
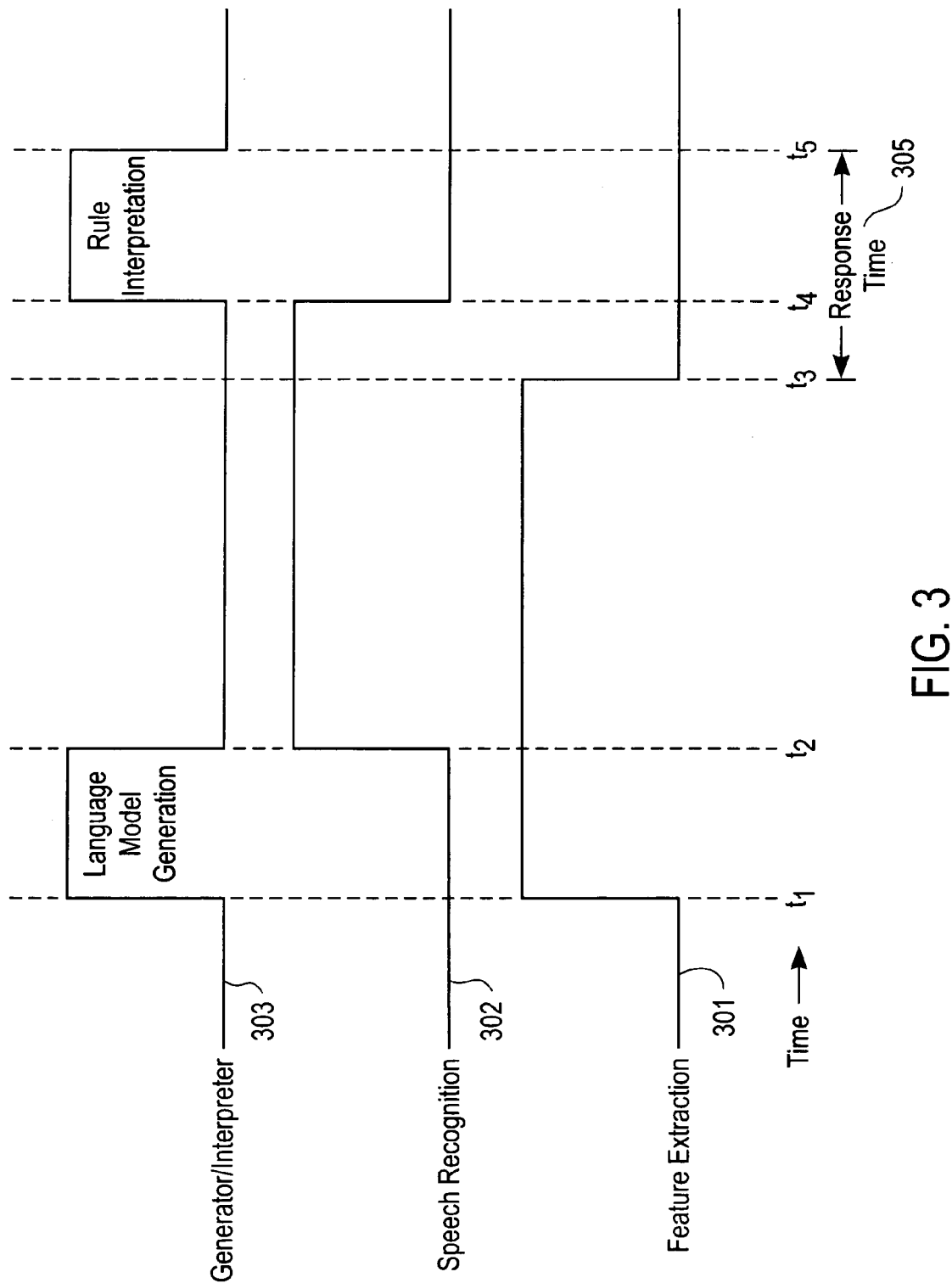
FIG. 3 shows the timing of speech recognition tasks performed by the functions shown in FIG. 2.

The timing of the operations of 200 is described with reference to FIG. 3. FIG. 3 shows when various tasks are performed in order to recognize speech from sound signals during a time interval. Note that in the timing diagram of FIG. 3 a high state is shown when the process is active and a low state indicates that the process is suspended or is idle. Speech recognition generally begins at time $t_1$ shown in FIG. 3 when the feature extraction process 301 becomes active upon the detection of sound which may include speech. Simultaneously, generator/interpreter process 230 becomes active shown by state 303 at time $t_1$ in order to generate the language model determined by the current operating context of the system. This process is done in parallel with feature extraction as shown by 301, which continues to extract speech features from sounds detected by apparatus 100. The language model generation process 230 will perform such things as determining which speech rules are active, based on the current context of the operating system and its application programs; building the language models for any dynamic speech rules; and combining the language models of all active speech rules into the language model which is transmitted to recognizer 220. The language model comprises a network of words which may be detected by recognizer 220. These sequences of words are recognized using these language models which represent phrases having specified meanings with the current operating context of the system. Each language model is actually implemented as a finite state automaton which determines a set of phrases which may be uttered by the user. These finite state automata are defined and discussed in the co-pending application entitled "Recursive Finite State Grammar" whose inventors are Yen-Lu Chow and Kai-Fu Lee, which has been filed concurrently with this application and has been assigned Ser. No. 07/999,017.

"Speech rules" are data structures which are used to assign a meaning or action to one or more sequences of words. Each speech rule has associated with it the following five components:

1. Name—The name of the speech rule;
2. Flags—information about the type of speech rule, including whether or not it is a command or category*, and whether it is static or dynamic;

* A Category can be an individual word or it can be another category. When it is a predefined category, the acceptable words are listed in that category. In example, numbers can be from one to nine. <Tens> are defined as a number in the tens location; and a number or a zero. <Hundreds> are defined as a number in the hundreds location; and a tens number or a zero; and a number or a zero. This can be continued to make up any arbitrarily large number. In each case the category is made up of previously defined categories except for the <numbers>, which is a list of individual words. Rules are the structure used to define how the words can be strung together. In English, there are grammar rules that define the noun-verb-subject sequence. A similar sequence must be identified explicitly for the speech recognizer. For example:

"Open Chooser".
   "Open the Chooser".
   "Open menu item Chooser".

could all be used to open the Chooser control panel. All of the acceptable word strings must be defined in order for the speech monitor to properly select the correct command. If the user says "Chooser open" in this example, it would not be recognized as an acceptable command. If this word string were added to the Rule, then the speech monitor would respond with an acceptable command.

3. Phrase list—the set of sequences of words which may be recognized, and their associated "meanings";
4. Context—an expression determining when the speech rule is active, as a function of the context of the operating system and its applications;
5. Action—an expression determining the "meaning" of the speech rule. For dynamic category speech rules, this expression is evaluated in order to dynamically compute the language model. For command speech rules, this expression is evaluated when the rule matches the spoken utterance.

Once language model generation is complete at time $t_2$ as shown in FIG. 3, then using the features extracted by the feature extraction process 210 (which have been buffered during the interval from $t_1$ to $t_2$), recognizer 220 starts processing the feature data at time $t_2$ as shown in FIG. 3. Using language model information 222 shown in FIG. 2, recognizer 220 starts performing recognition upon the buffered features received from feature extraction process 210 by performing a search of words in the received language model to determine whether there is a match. Of course, the user continues speaking, and features are continuously transmitted to recognition process 22( ) until time $t_3$. At time $t_3$, feature extraction process 210 ceases to be active (as no more speech information is detected in sound signals 201). Word recognition of the features generated between times $t_1$ and $t_3$ continues until time $t_4$, at which time the word recognition (or search) is complete, and interpretation of the sequences of words and performance of the actions can take place. This occurs between times $t_4$ and $t_5$ wherein language model generator/interpreter 230 searches for a (command) speech rule which corresponds to the words recognized by 220. Once this has been done, the actions specified by the words are performed, if any. Once rule interpretation of the words received from recognizer 220 is complete, then at time $t_5$, the action has been performed. The duration of time between times $t_3$ and $t_5$ (when the user stops speaking and performance of the specified actions is complete) is the response time 305 of the recognition system as perceived by the user. It is one object of the present invention to minimize the time between times $t_3$ and $t_5$. This is accomplished in the preferred embodiment by using the time between $t_1$ and $t_2$ in order to compute a language model which will result in the search, occupying the time between $t_2$ and $t_4$, and the rule interpretation, occupying the time between $t_4$ and $t_5$, being much faster. Consequently, the user's perceived response time, the time between $t_3$ and $t_5$, is thus reduced.

Language Model Representation

Each speech rule has a phrase list associated with it. Each phrase in the list determines a set of sequences of words that may be recognized, and a meaning associated with any of those word sequences. The phrases are used to construct a language model, which is represented as a finite state automata such as shown in FIGS. 4 through 7. Each language model is a network of terms which may be recognized by the recognizer. Each term in the language model may refer either to a specific word, or recursively to another language model, as discussed in the co-pending application entitled "Recursive Finite State Grammar." The language models are used by recognition process 220, wherein a non-deterministic sequence of states may be traversed in order to achieve an end state wherein speech is recognized, and the recognized words are transmitted to interpreter 230. A process, which is not discussed in detail here but is well-known to those skilled in the art, determines which of the active speech rules match the recognized words, and performs their associated actions. These actions are typically performed by causing operating system events to occur in the computer system. These events are detected by the operating system of the preferred embodiment and cause certain actions to occur, such as the opening of files, printing, or manipulation of user interface objects. Events are detected by the "AppleEvent Manager" which is described in the publication *Inside Macintosh Vol. VI* (1985), available from Addison-Wesley Publishing Company.

Figure 4:
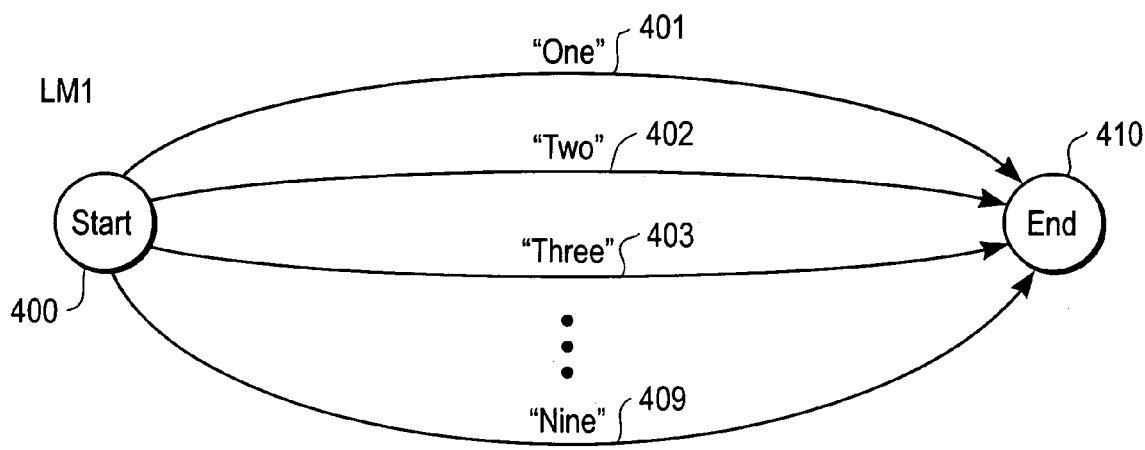
FIGS. 4 through 7 are finite state automata for language models which may be generated in a preferred embodiment.

Language models will now be discussed with reference to a series of specific examples exemplified in FIGS. 4 through 7, for defining the recognition of the numbers one through ninety-nine. For example, FIG. 4 shows a first language model LM1 which comprises each of the words for the digits "one" through "nine." Therefore, each of the phones which comprises the words "one," "two," "three," etc. are encoded into LM1. In other words, at start state 400, if the word "one" (phonetically "wuhn") is detected, then path 401 of LM1 is taken, and the language model LM1 is satisfied at state 410. Similarly, if a "three" is detected, then language model LM1 starts at 400, traverses path 403, and ends at state 410, satisfying language model LM1.

Figure 5:
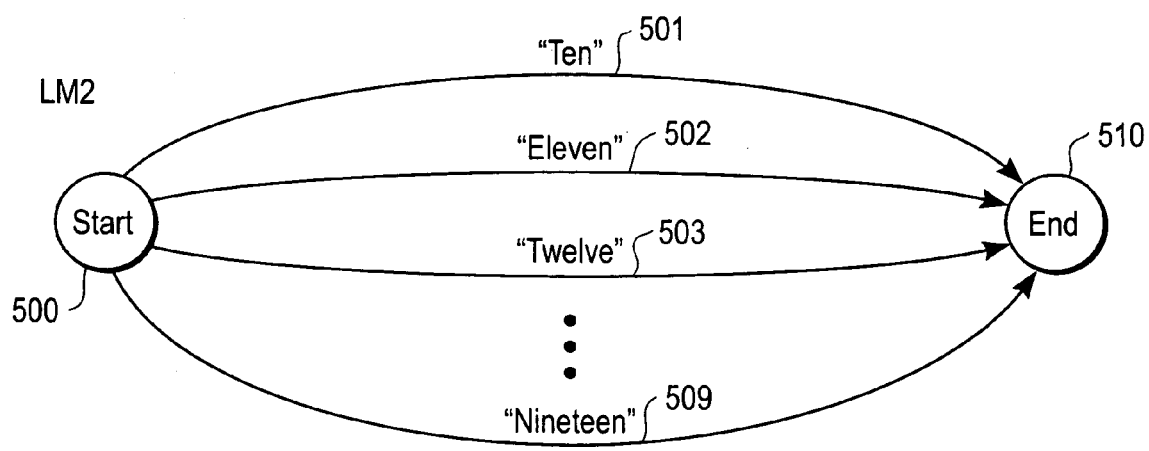
Figure 6:
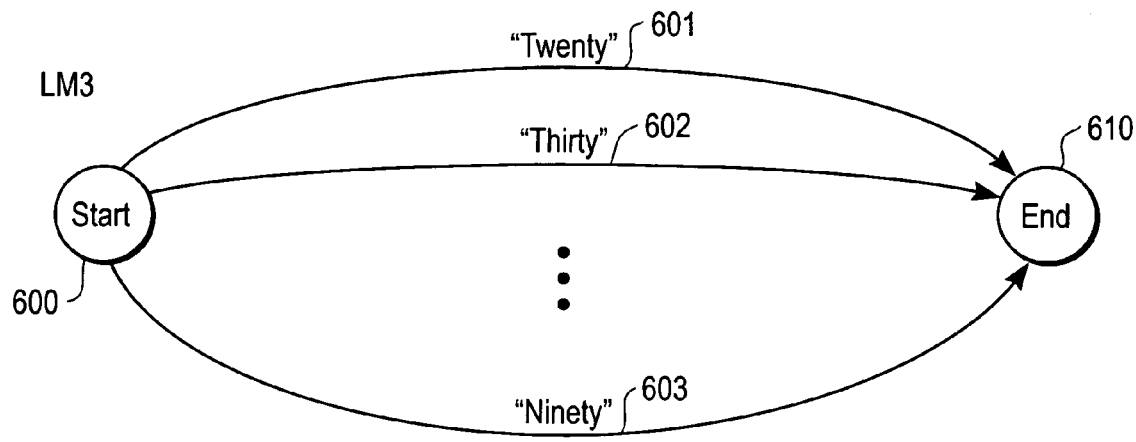
Figure 7:
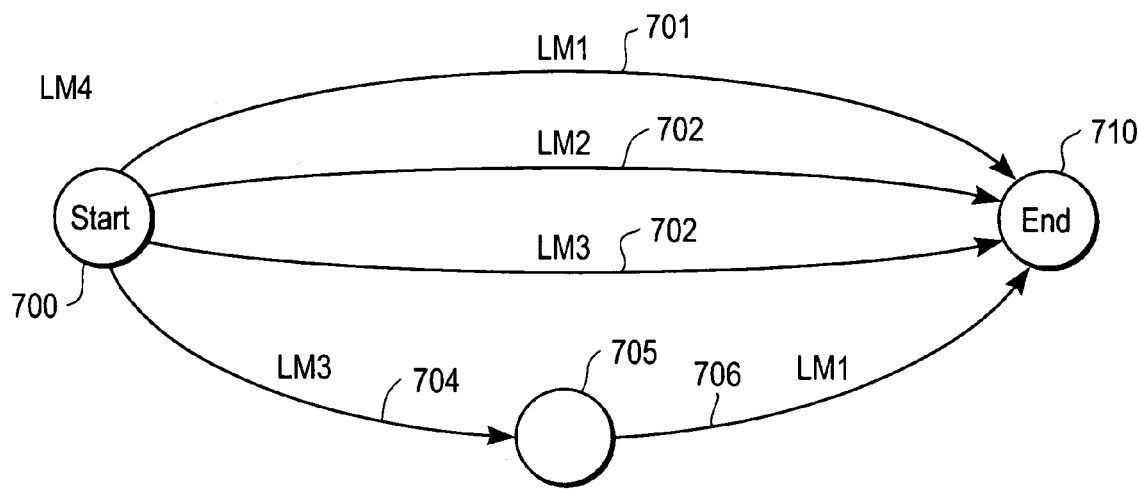

Similarly, in language model LM2 shown in FIG. 5, the language model LM2 will start at state 500 and traverse one of the paths 501 through 509 to reach the end state 510. Language model LM2, as shown in FIG. 5, is similar to LM2, however, it comprises words for the numbers "ten" through "nineteen," and the associated phones which are received from feature extractor 220. For example, if the word "eleven" is detected, then LM2 will traverse path 502 to reach end state 510 and language model LM2 is a "match." If any of the numbers "one" through "nineteen" have been recognized, then one of language models LM1 or LM2 is matched. This may be used for defining other actions (for commands or expressions to be evaluated for categories) which may take place using these language models. Another language model LM3 is shown in FIG. 6. LM3 of FIG. 6, like LM1 and LM2 of FIGS. 4 and 5, is also a finite state automata which defines all the words having phones which represent values from "twenty" to "ninety" by ten. For example, if the number "thirty" is detected, LM3 is satisfied by starting at state 600, traversing path 602, and ending at state 610. If any of the words "twenty," "thirty," etc. is detected by process 210, then the language model LM3 is a match.

Language models may also reference other language models for more complex sequences of words. This is discussed in co-pending application entitled "Recursive Finite State Grammar." For example, language model LM4 shown in FIG. 7 references the previous three language models LM1, LM2, and LM3 in order to define all the numbers between 1 and 99 which may be recognized. For example, each of paths 701, 702, and 703 are the language models heretofore described for matching the words "one," "thirteen," "fifty," etc. By paths 701–703, language model LM4 is a match if any of the three previous language models is determined to be a match. In addition, to handle the remaining numbers, if LM3 is determined to be a match, path 704 may be traversed wherein an intermediate state 705 may be reached. When traversing LM3, path 704, through intermediate state 705 and the remaining path 706, the numbers which are a combination of matches of language models LM3 and LM1 may be recognized, for example, "twenty-one" or "ninety-nine." A deterministic algorithm in recognizer 220 determines which of the states has a higher probability, and this information is used to transmit to interpreter 230 the recognized sequence of words as information 221.

The foregoing definitions of language models are useful for determining data which is constant prior to run time, however, additional aspects of the present invention provide for dynamic determination of language models according to data associated with application programs and dynamic data in the operating system.

Dynamic Categories

Figure 8A:
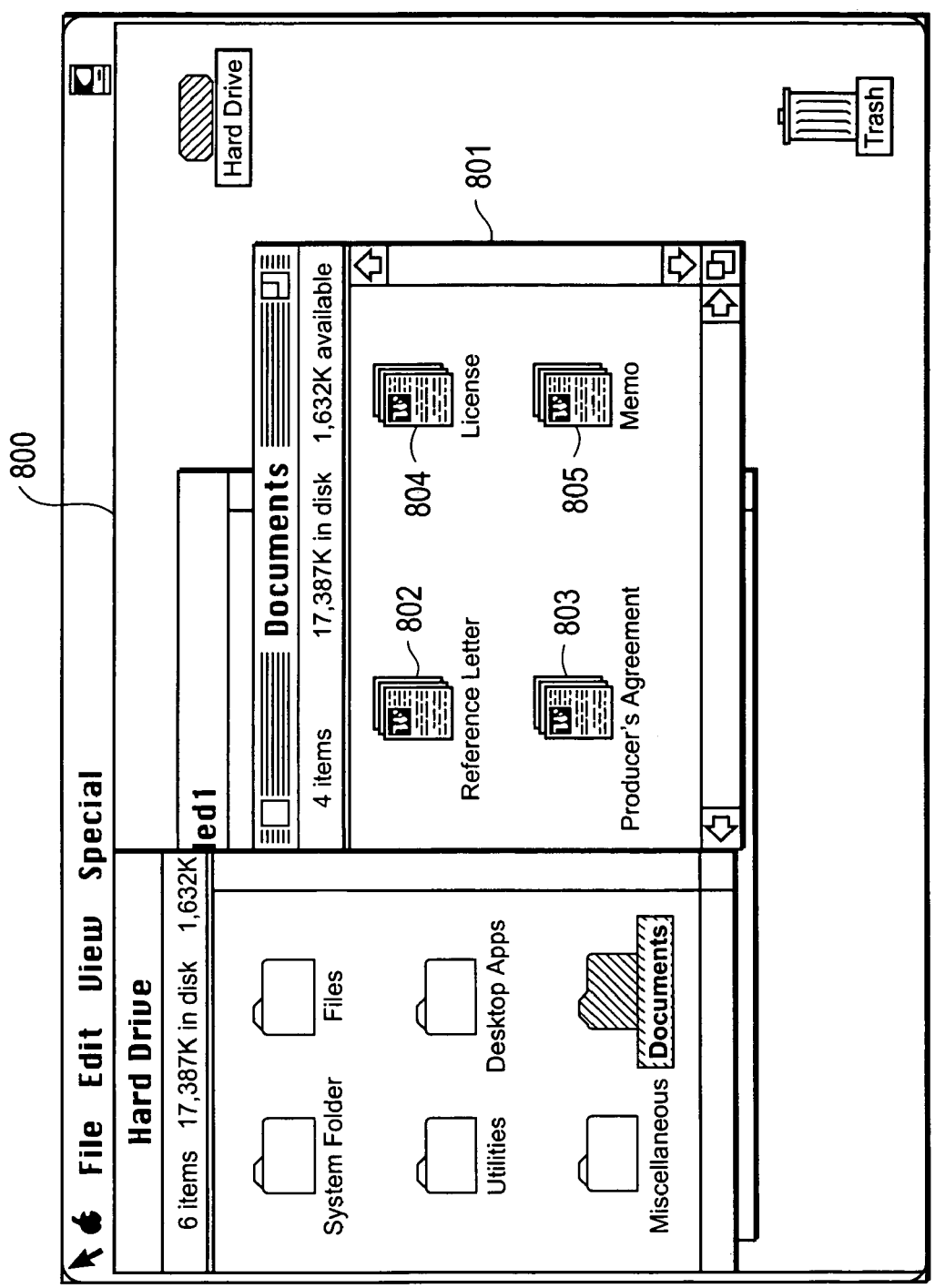
FIGS. 8a through 8c show a user interface which may be controlled by user-spoken commands.
Figure 8B:
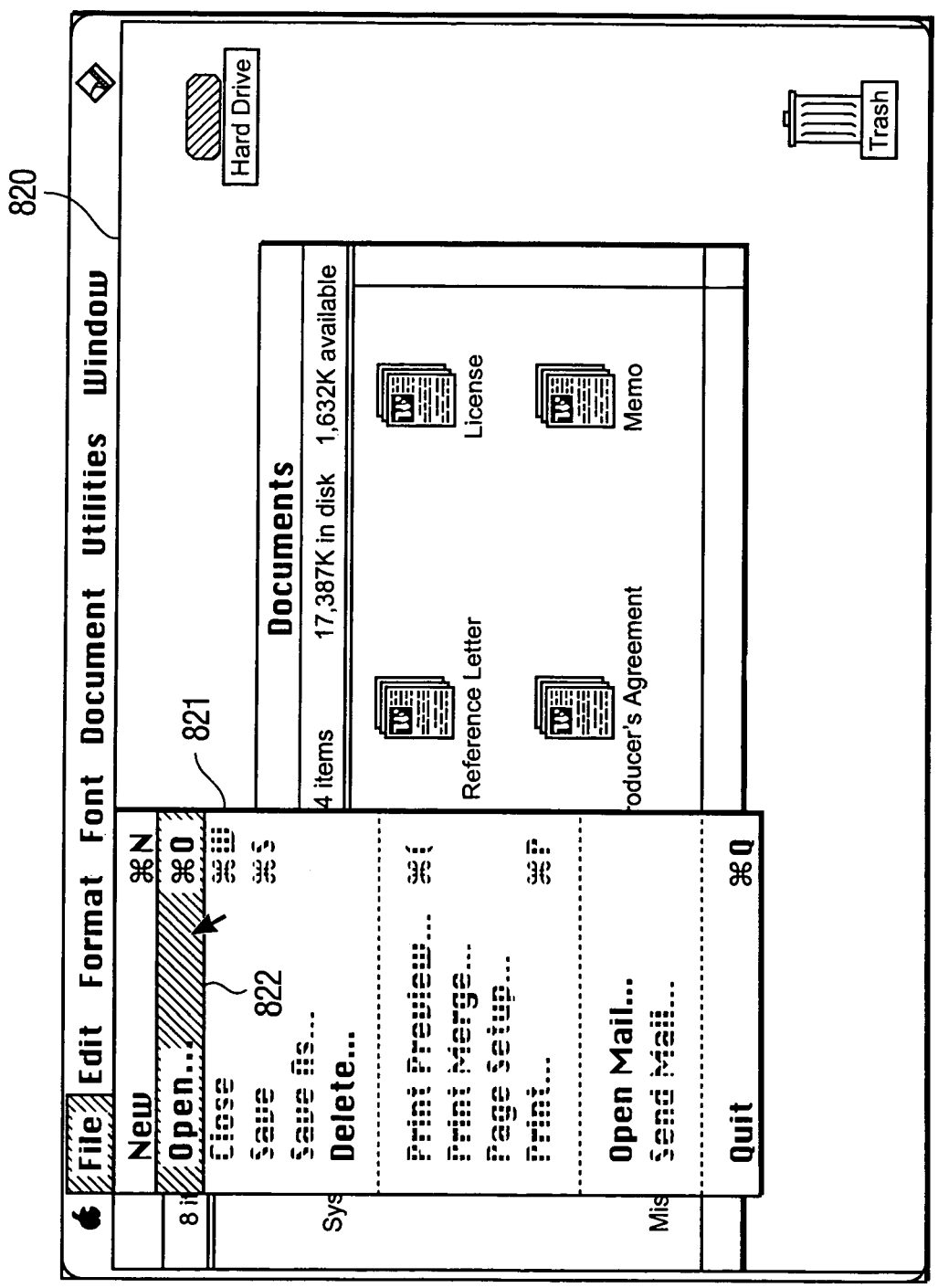
Figure 8C:
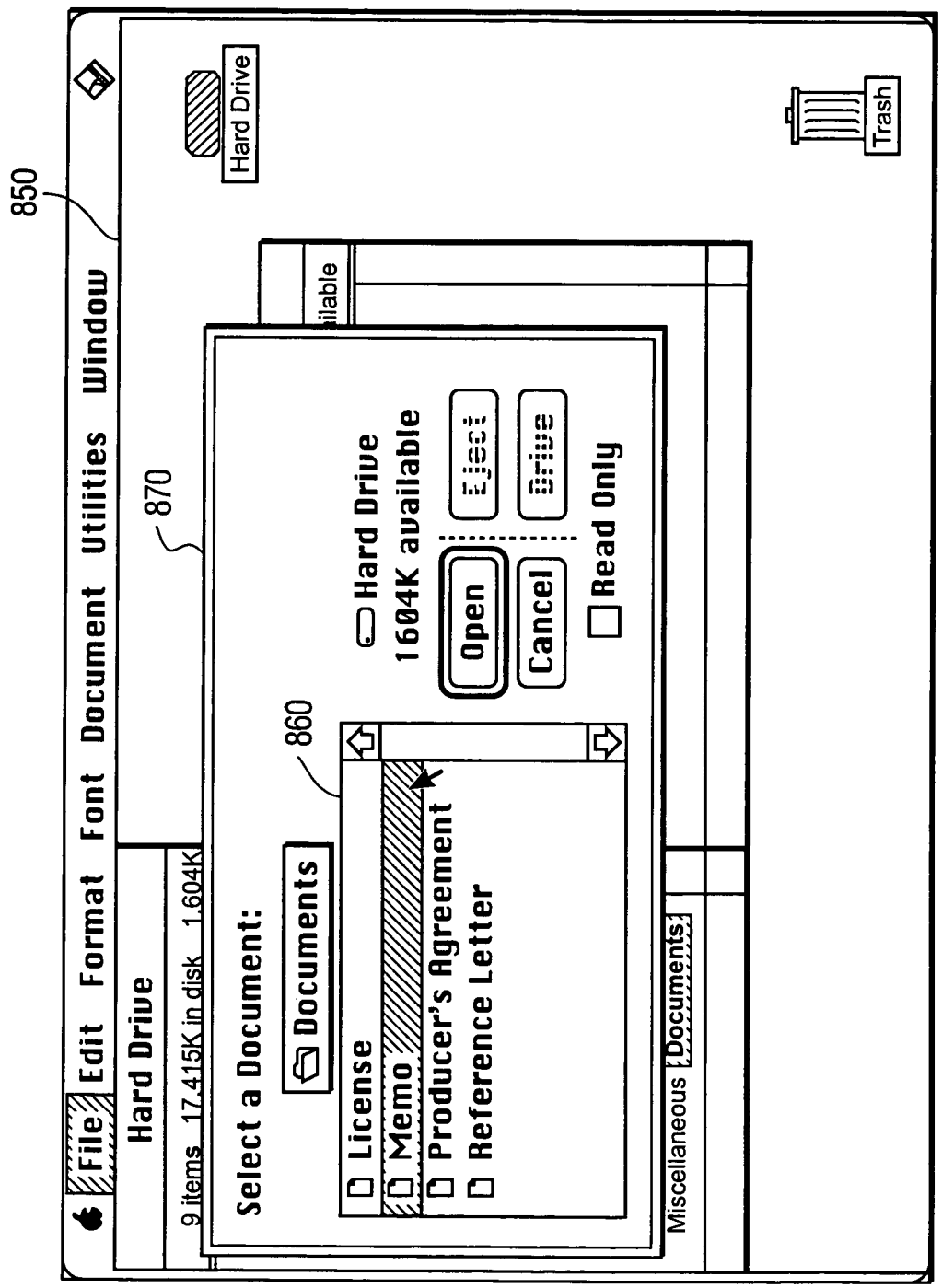
Figure 10:
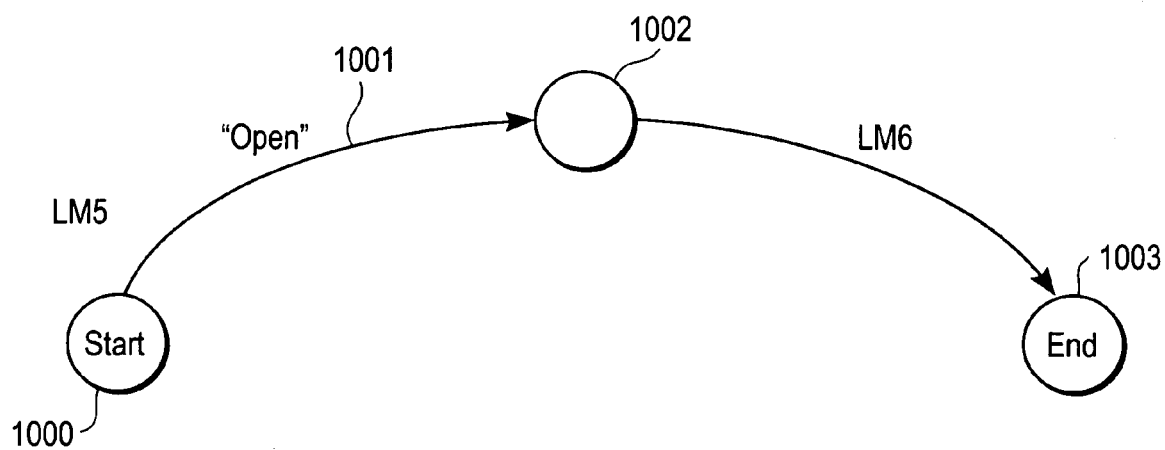
FIGS. 10 through 12 show language models for performing the actions shown in FIGS. 10 through 12.
Figure 11:
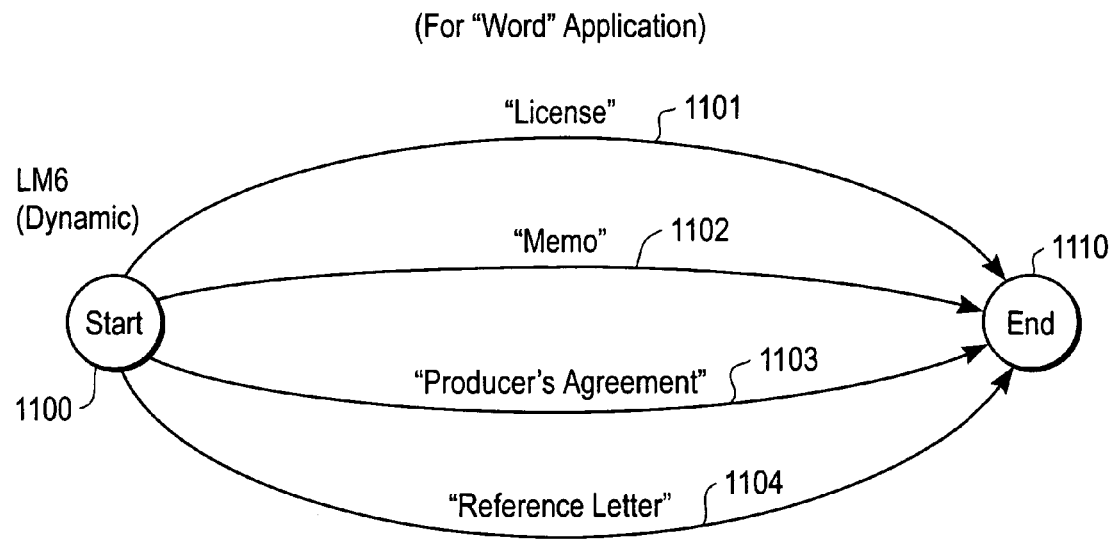

Although the language models discussed with reference to FIGS. 4 through 7 are adequate for constant data which can be anticipated (such as the numbers 1 through 99) data in a computer system is typically dynamic during run time. Files, directories, and other data often change during run time so it is important to support a facility which will update language model categories at appropriate intervals to provide for additional items which may be recognized. Thus, language models can also be dynamic during the operation of the speech recognition system, depending on the state of data in the machine. For example, with reference to the screen display shown as screen 800 in FIG. 8a, several documents 802 through 805 are present in the directory window 801 entitled "Documents." A language model LM5 as shown in FIG. 10 may reference a second language model LM6. LM6 is shown in FIG. 11. Therefore, the command "Open <file name>" may be represented by this state diagram wherein <file name> is equivalent to the language model LM6. LM6 is flagged, in this embodiment, as a "dynamic" category wherein the definition of LM6 may change according to data in the machine or the particular operating context. Language model LM5 maps to a specified action to occur for a particular application such as shown in 820 of FIG. 8b. Screen display 820 shows the "Open" action 822 being performed under the pull-down menu 821 of the application program currently running. This application will then initiate a dialog window 870 with the user as shown in screen display 850 of FIG. 8c. Thus, each of the file names in the directory "Documents," "License," "Memo," "Producer's Agreement," and "Reference Letter" have been listed in 860. Note that the language model LM6 as shown in FIG. 11 comprises the list of all the file names (shown as icons 802–805) contained in the "Documents" directory window 801 as shown in FIG. 8a above. If one of these files is deleted or a file is added, then the LM6 language model shown in FIG. 11 will change according to the data contained within the "Documents" directory 801. This is accomplished by flagging LM6 as a "dynamic" category which changes during the course of the operation of the speech recognition system.

Figure 9A:
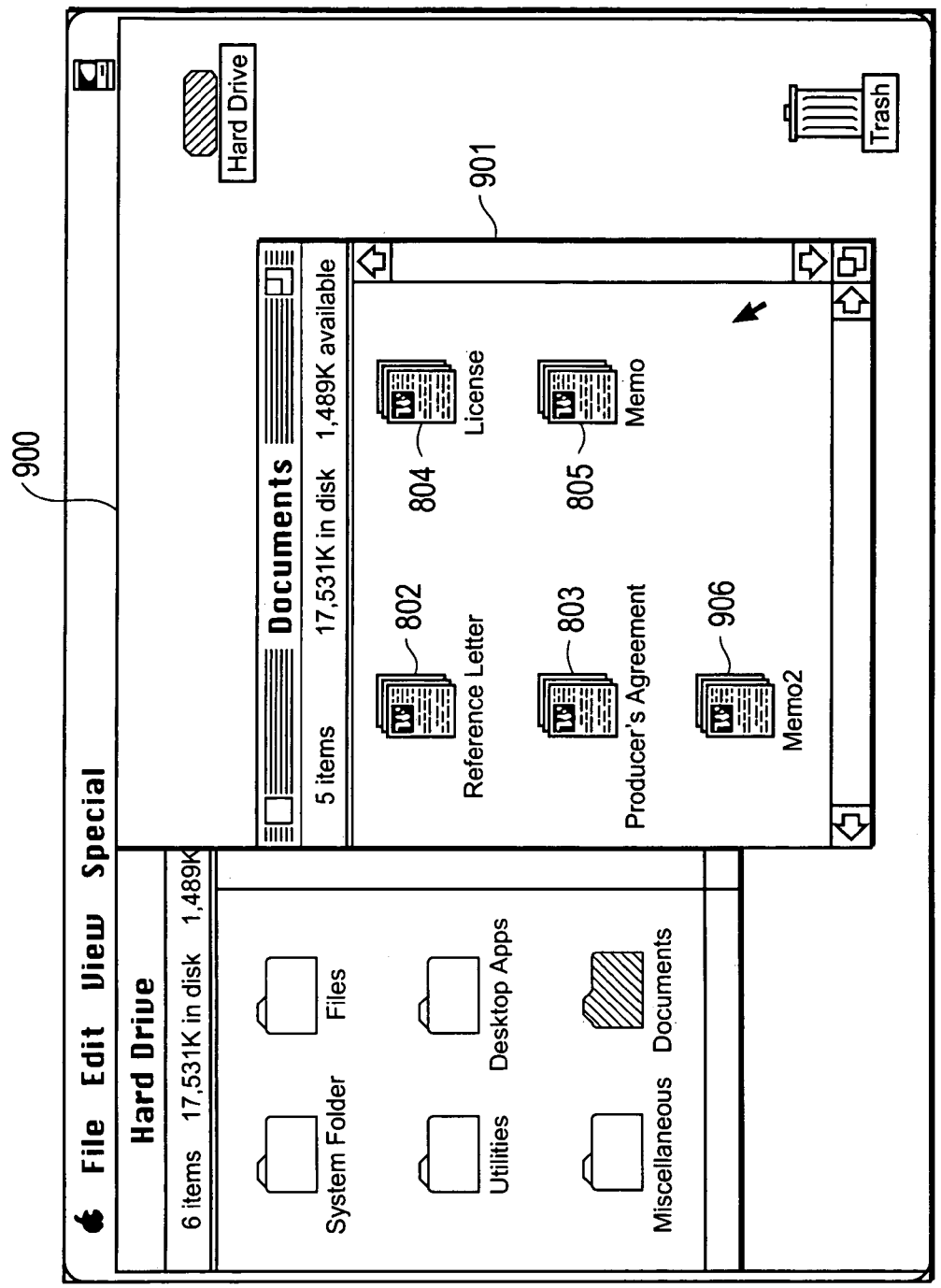
FIGS. 9a and 9b show how adding a file can affect the spoken commands issued.
Figure 9B:
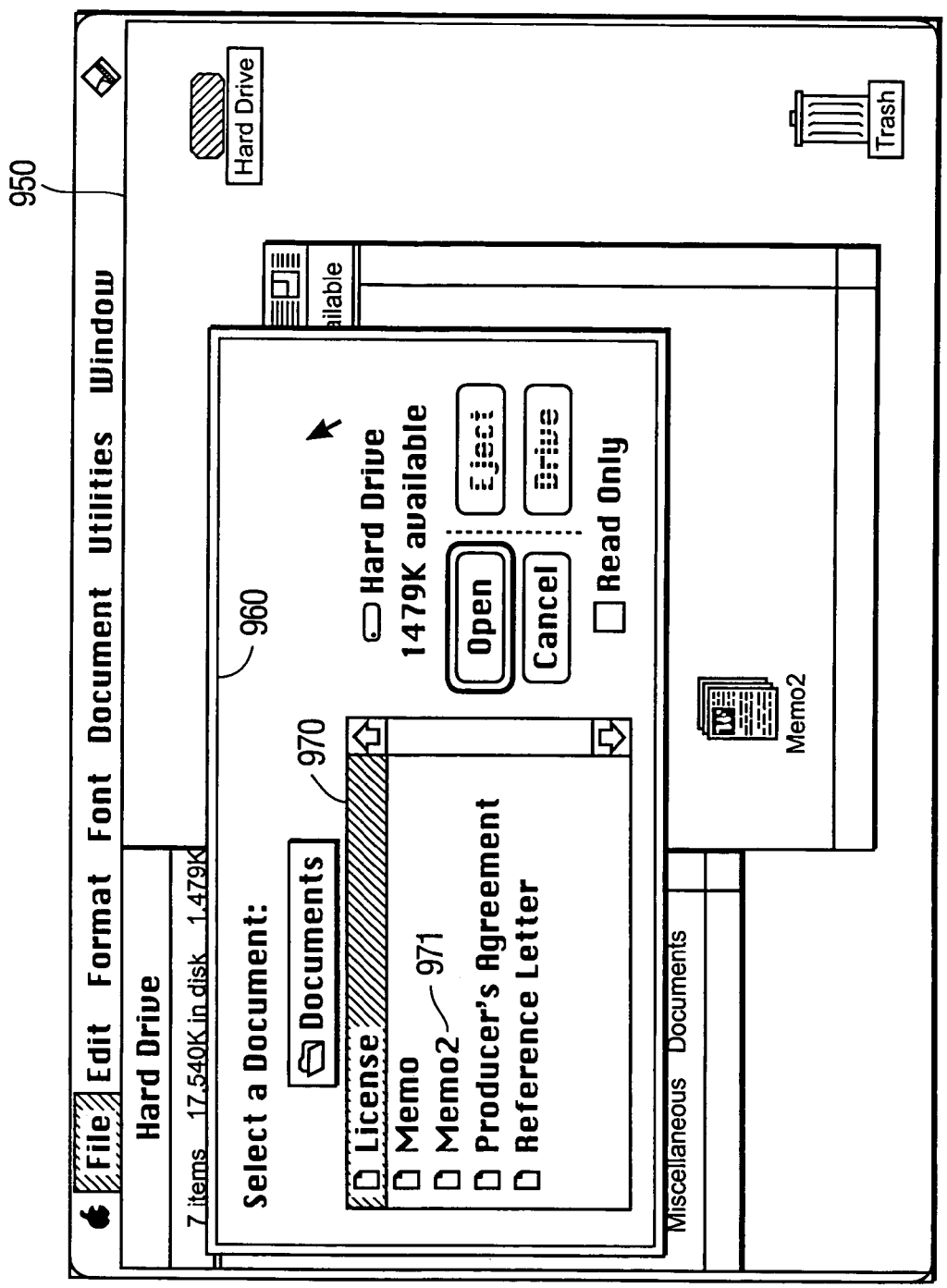
Figure 12:
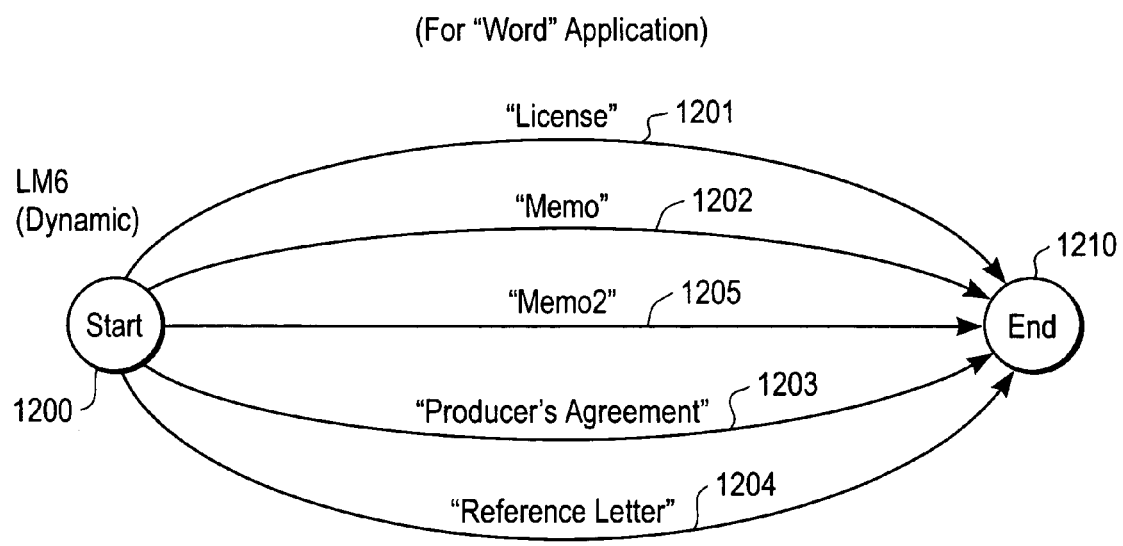

For example, if an additional file is added to the "Documents" directory 801, this new value will appear in the file "open" dialog window 870 as discussed above, and become a part of the new language model generated for the application program. For example, as shown in screen 900 of FIG. 9a, if an additional document entitled "Memo 2" 906 is added to the directory "Documents" listing 901, then the language model category LM6 shown in FIG. 11 will have to be updated. As shown in FIG. 12, once the document entitled "Memo 2" 906 is added to the directory entitled "Documents" 801, then the new language model LM6 will be as that shown in FIG. 12. Note that FIG. 12, in addition to the earlier four documents discussed above, will now comprise the additional document "Memo 2." And the updated language model LM6 shown with reference to FIG. 11 is now shown in FIG. 12. Thus, when a user issues an "Open" command, then the appropriate dialog will list the new document entitled "Memo 2" as shown in screen 950 of FIG. 9*b*. 950 of FIG. 9*b* now shows the dialog 960 which comprises the file name entitled "Memo 2" 971. Note that, in the preferred embodiment, dynamic categories may be updated at various periodic intervals, such as system initialization, application launch time, or upon the detection of speech (e.g., $t_1$ in FIG. 3), however, it is anticipated that such categories may be updated when relevant data changes, in alternative embodiments, using other techniques.

Partitioning Speech Rules

Another aspect of the preferred embodiment is the use of contexts in order to determine which speech rules are used to specify the language model that is generated and sent as information 222 to recognizer 220. Again, this technique helps limit the vocabulary which recognizer 220 searches for determining recognized words. This has the effect of reducing the response time of the speech recognition system, as well as enabling the system to give the correct response to an utterance that may have more than one interpretation (depending upon the context).

The speech rule is a data structure used by generator/interpreter 230 to assign meanings to phrases uttered by the user. In general, any particular phrase may or may not have meaning at a given time. For example, the phrase "close window" may have meaning when there is a window visible on the computer screen, and may not have a meaning when no such window is visible. Similarly the phrase "print it" may make sense only when there is a referent of the word "it" visible or highlighted on the computer screen, or when the previous dialog with the computer (either spoken or graphical dialog window) has referred to a document that can be printed.

In order to understand the justification for speech rule partitions, it is helpful to consider two possible methods for generating a language model from a set of speech rules. The first method simply uses all of the speech rules to construct a one-time, static language model. The resulting language model possibly allows the speech recognizer to recognize phrases that are not valid in the current context. After recognition, the interpreter determines all speech rules which match the recognized words, and then it discards any contexts indicated as not valid. The benefit of this method is that one language model can be constructed at system initialization time, and it does not have to be modified thereafter. Since language model construction is a non-trivial effort, this tends to reduce the amount of computation required by language model generator/interpreter 230 in some circumstances during language model generation. On the other hand, because the language model tends to be larger than necessary, this may have a negative impact on the performance of recognizer 220, making it slower and less accurate. In general, the larger the number of phrases that a language model can recognize, the slower and more error prone the recognition process is.

A second method of constructing the language model is to construct it dynamically. When speech is detected, the context of each speech rule is evaluated, and if it is determined to be active, then the speech rule's phrases would be added to the overall language model. This method results, in most circumstances, in the smallest possible language model being sent to recognizer 220. The advantage is that the recognition process performed by recognizer 220 is optimally efficient and accurate. The disadvantage of this approach is that it requires that the context of each speech rule be evaluated every time speech is detected. Furthermore, it requires that the language model be completely built upon the detection of each spoken utterance. Since the computation required to do this is non-trivial, in some instances, this has an overall negative impact on the response time (e.g., $t_3$ to $t_5$, see, FIG. 3) of the recognition system.

Each of these techniques has its advantages and disadvantages. The static method places the computational burden on recognizer 220, with the result that word recognition is unnecessarily slow and inaccurate. The dynamic method optimizes speech recognizer 220's performance at the expense of computing a language model from scratch from the entire database of speech rules. As the number of speech rules increases, this computation would be prohibitively costly and result in very long response times. The preferred embodiment combines the benefits of each of these techniques.

The preferred embodiment takes advantage of the following:

Some rules' contexts can be expressed declaratively. This means that they do not need to be evaluated at speech detection time, and that the contexts can be compared and otherwise manipulated by language model generator 230.

Many rules may share identical or similar contexts.

Some sets of rules may have contexts that are mutually exclusive. For example, a common context for speech rules specifies that the rule is active when a particular application is frontmost on the user's computer. (In the Macintosh computer 100 of the preferred embodiment, the frontmost application is the one whose menus are present in the menubar, whose windows are frontmost on the screen, and who receives and processes user events such as selections and keystrokes). Since only one application can be frontmost at any time, there can be only one rule set having an "application" context active at any one time.

At system startup time, when language model generator 230 loads all of the system's speech rules, it constructs a partition of these rule sets based on their contexts. In other words, it divides the speech rules into sets, such that Every rule in a set has an identical context.

For two different sets, the rules in those two sets have different contexts.

Since the speech rules in any given set of the partition have the same context, it is necessary that they will all be either active or inactive for a given utterance (i.e., at any given time). Thus, the language model generator is free to compile all of the phrases from a given rule set into a single language model.

At speech detection time, then, language model generator 230, instead of having to test the context of each speech rule and build the entire language model from scratch, simply tests the context of each rule set and builds the currently used language model from the language models of each of the active rule sets. This method reduces the amount of computation required to dynamically construct the language model. To the extent that language models have common contexts, and it also constructs a current language model which is optimal for the speech recognizer 220, in that it only admits phrases which are valid within the current context.

The speech rule's context is simply a label denoting when that rule is considered to be active. That context label has one of the following forms:
- a primitive label or symbol indicating either some application, some window in an application, some user, or any other application-defined context;
- a conjunction of context labels of the form context and context and . . . ;
- a disjunction of context labels of the form context or context or . . . ;
- the negation of a context label of the form not context.

In addition to the (static) context assigned to every speech rule (or speech rule set), the language model generator maintains a set of contexts which represent the "current context." This consists of a set of primitive context labels, each of which reflects some fact about the current operating context of the system. Some of the labels are added to or removed from the current context by language model generator 230 itself (such as labels for the frontmost application, frontmost window, and current user), while others are explicitly added and removed by application programs (e.g., 241, 242, etc.). Whenever the current context is modified, language model generator 230 compares the context label of each speech rule set with the set of current context labels in order to determine whether or not it should be considered active. The comparison works as follows:
- if the context is a primitive label, then it is considered active if it is found in the set of current context labels;
- if the context is a conjunction, then it is considered active if all of the conjoined context labels are considered active;
- if the context is a disjunction, then it is considered active if any of the disjoined context labels are considered active;
- if the context is a negation, then it is considered active if the negated context is not considered active.

Finally, at speech detection time, the language models from those rule sets that have active context labels are combined to form the overall or current language model 222 that is sent to speech recognizer 220 and also used to interpret the acoustic signal as a sequence of words.

Figure 13:
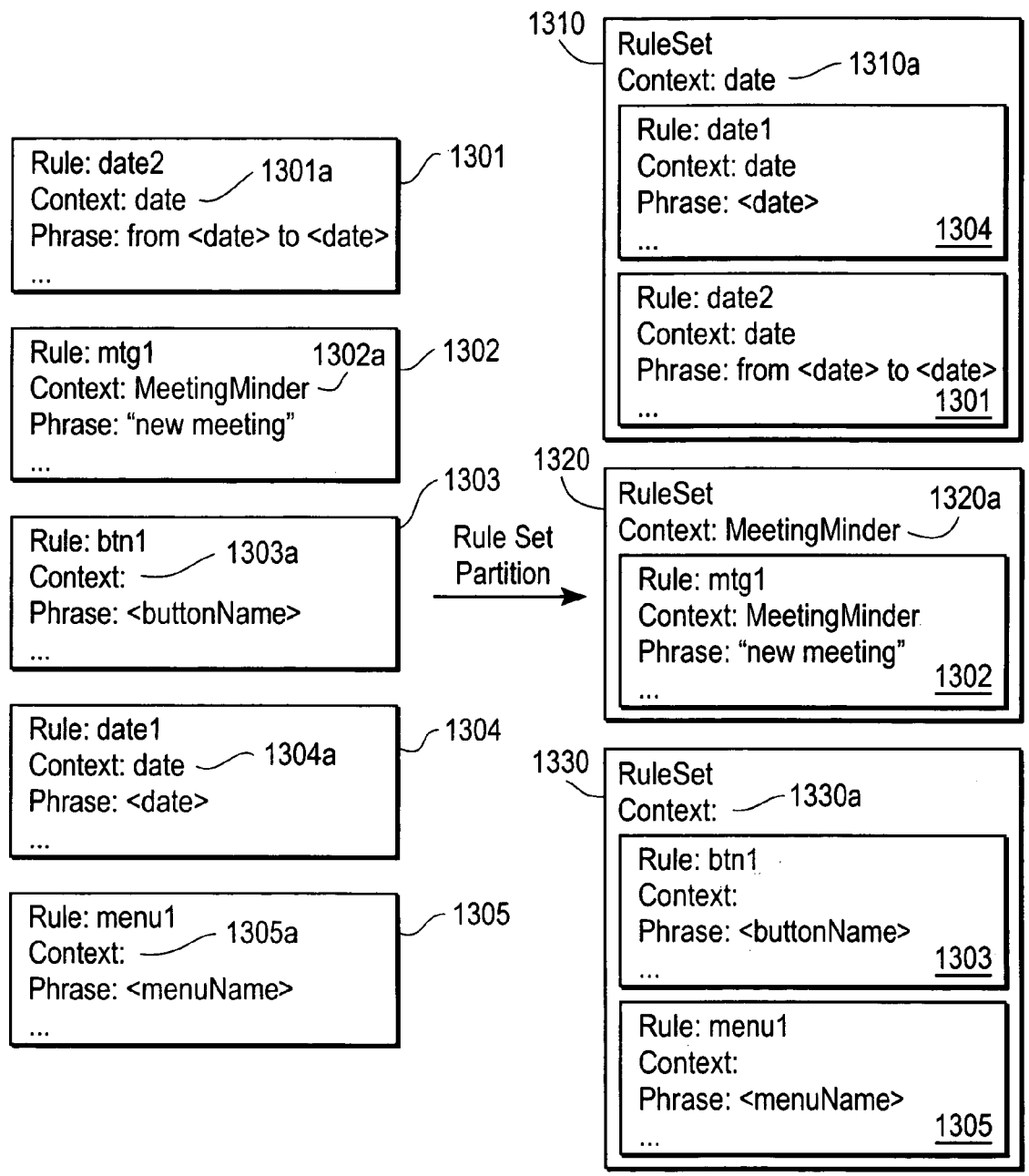
FIGS. 13 and 14 show partitioning of speech rules for different operating contexts.

A simple example of rule set partitioning is shown and discussed with reference to FIG. 13. For example, in the system, all of the speech rules which are present in the system may be illustrated by blocks 1301 through 1305 on FIG. 13. As was discussed previously, each speech rule has an associated context, which is illustrated in FIG. 13 as 1301*a* through 1305*a*. Thus, speech rules 1301 and 1304 have the context "date," and rule 1302 has the context "MeetingMinder" which may be an application program or other item which is active in the user's computer system. Also, 1303 and 1305 show no context, indicating that they are always active. At any rate, at system startup time, the system scans through the list of all the speech rules, in this case, 1301 through 1305, and arranges the speech rules into sets according to their context. That is, each and every unique context has associated with it all the speech rules which have this context. Thus, a speech rule set is created from the speech rules for the given context. For example, when this partitioning occurs, which is illustrated in FIG. 13, speech rules 1301 and 1304 will become part of the speech rule set 1310 which have the identical context "date" 1310*a*. Thus, at system startup time, the speech rules 1301 and 1304 are placed into rule set 1310 with the context "date" 1310*a*, and a language model is constructed for the rule set as a whole. Then, at speech detection time, if the "date" context is active, then it's language model is included in the top-level language model that is used for speech recognition. This is illustrated with reference to FIG. 14.

Figure 14:
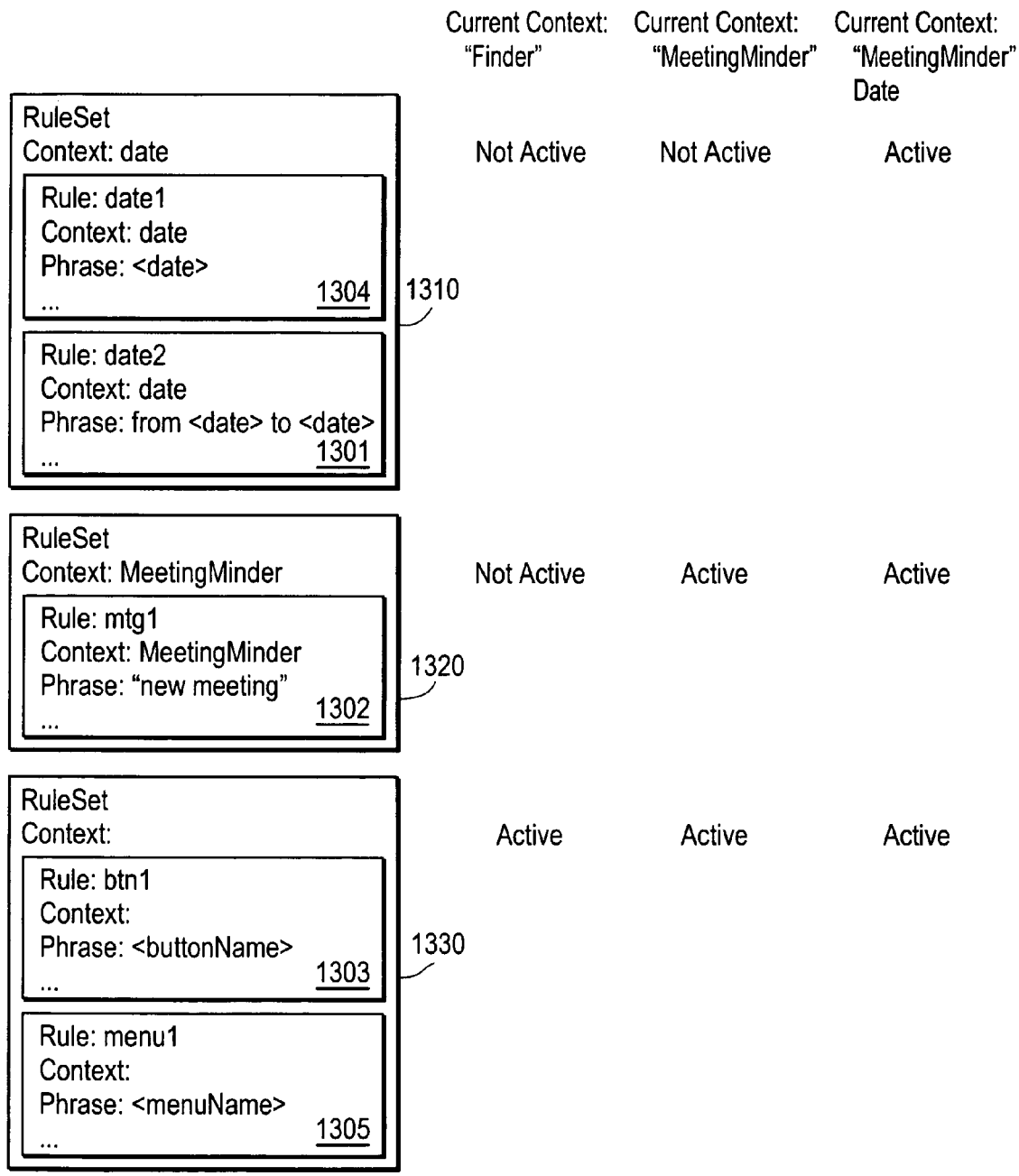

Each of the rule sets 1310, 1320, and 1330 are illustrated in FIG. 14. FIG. 14 illustrates which rule sets become active when various contexts are detected. For example, when the "Finder" application program is frontmost in the Macintosh operating system, only the global context rule set partition 1330 is active. Thus, rules 1303 and 1305 will be used to create a language model and, when words are received from the recognizer, used to interpret phrases to perform actions in the computer system. Instead of having to test every rule in the system, only rule set 1330 is used to generate the current language model and interpret words from recognizer 220. Thus, at speech detection time, language model generation will be very simple by only referring to rules 1303 and 1305 from rule set partition 1330. Likewise, when the application "MeetingMinder" is frontmost, rule sets 1320 and 1330, which comprise rules 1302, 1303, and 1305, will be used to generate the language model. In the third instance, the application "MeetingMinder" is frontmost, and it has added the context "date" to the current context. Therefore, all three of the illustrated rule sets will be used to generate the language model and used to perform rule interpretation. Rule set 1310 is active since its context "date" is found in the current context; rule set 1320 is active since its context "MeetingMinder" is found in the current context; and rule set 1330 is active since it has a null context, and thus is always active.

The consumption of processing power is reduced by grouping all of the speech rules in the system into sets which may be easily referenced during language model generation and speech interpretation. Even though the examples shown in FIGS. 13 and 14 show a limited set of speech rules (e.g., 1301 through 1305), it is likely that, in an operating speech recognition system, a large number of speech rules may be present having various contexts which would require the determination of each and every context for every rule. As discussed above, this consumes unnecessary processing power and time at language model generation time and may adversely affect response time. Thus, the preferred embodiment reduces this overhead by partitioning the rules into rule sets by context to improve overall response time.

Assigning Meaning to Utterances

One additional problem posed by prior art speech recognition systems is that of associating a meaning with a sequence of recognized words. For isolated word recognition systems the problem is much simpler. At any time in such a system, only a limited number of words or phrases can be recognized (typically less than 100). When one of those words or phrases is recognized, the system typically responds in a pre-determined way.

With a continuous word recognition system, there may be an extremely large, or even unbounded, number of phrases that can be recognized. It is clearly not possible nor desirable to precompute appropriate responses to all recognizable utterances. Furthermore, a speech recognition system which allows for the dynamic creation of language models (i.e., the phrases to be recognized are determined dynamically by the state of the operating system and its application programs) has no possibility of precomputing responses to all recognizable utterances.

The preferred embodiment uses a technique of assigning the syntax (what words are recognized in what order) and the semantics (the meaning of an utterance) of a set of phrases in a common data structure, called a speech rule. Every speech rule contains a set of phrases that may be recognized. These phrases may be complete utterances that may be spoken by the user, or they may be phrases representing partial utterances which are incorporated into other speech rules. In the former case, the meaning is represented as a sequence of actions to be taken by the system when the corresponding utterance is recognized. In the latter case, the meaning is represented by a data structure which is computed according to instructions stored in the speech rule, and which is passed to other speech rules which refer to the speech rule in question.

For example, consider the case of a speech rule which represents a set of phrases that a user may speak denoting a numeric value. The purpose of the speech rule in this case is not only to define which phrases the user may utter, but also how to derive the intended numeric value from each of those utterances. For example, it may be desirable that one would associate the spoken words "forty three" with the numeric value "43." This speech rule would in turn be referred to by another speech rule that allowed the user, for example, to say "print page <num>", where <num> refers to the set of phrases defined by the speech rule under discussion. In the preferred embodiment, the speech rule for numeric phrases is known as a "category" rule, and the speech rule for the print command is known as a "command" rule.

SUMMARY

Figure 15:
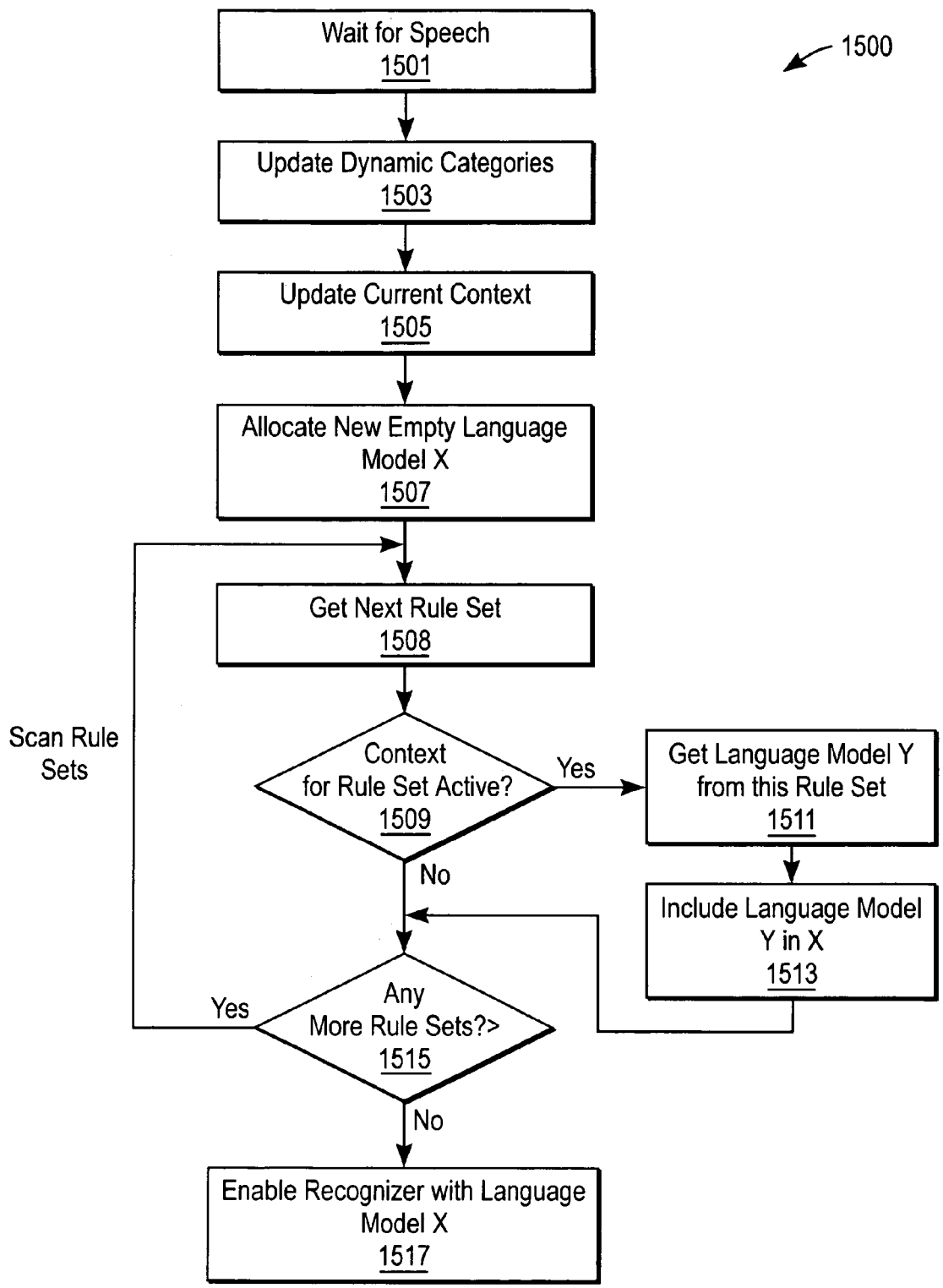
FIGS. 15 and 16 show process flow diagrams of processes performed at language model generation time and speech rule interpretation time.

A summary of some of the techniques described above will now be discussed with reference to FIGS. 15 and 16. Process 1500 of FIG. 15 shows a flow diagram of the sequence of steps taken by language model generator/interpreter 230 between times $t_1$ and $t_2$, that is, 1500 shows the generation of the language model upon the detection of speech. Generator 230 is essentially idle while waiting for speech to be detected at step 1501. Upon the detection of speech, any speech rules containing dynamic categories which are flagged to be updated upon the detection of speech are updated at step 1503. Of course, as discussed above, dynamic categories may be updated at various other intervals, however, this has been illustrated for the simple case of updating categories upon the detection of speech. Thus, the language models for speech rules specifying dynamic categories in the system will be updated at this time. File names and other operating parameters may be obtained and used to build the current language model of each dynamic category being so updated. Then, at step 1505, language model generator 230 will update the current context. That is, it will determine the current operating context of the system by determining active application programs and other operating parameters of the user's system. In this manner, rule sets with given contexts may be tested to see whether they should be used to create the language model. Then, at step 1507, a new language model X is created which, at this time, is an empty language model. Then, at steps 1509 through 1515, all of the rule sets in the system are scanned to determine whether each of their contexts are active. Thus, at step 1509, it is determined whether the context for a given rule set is active. As discussed previously, this may require conjunctions, disjunctions, or negations, as is well-known in prior art techniques. If so, then the language model from the rule set at step 1511 is included into the current language model X being generated at step 1513. Step 1515 determines whether there are any more rule sets to check. If the context for the rule set being viewed is not active, as determined at step 1509, then the language model is not added to the current language model X being built. In any case, step 1515 returns to step 1509 if there are more rule sets to be checked. Upon the detection of no other rule sets in the system, the recognizer can then be enabled with the current language model X which has been generated at step 1517. Language model creation is then complete at step 1517, and recognition can now commence, as is illustrated at time $t_2$ in FIG. 3.

Figure 16:
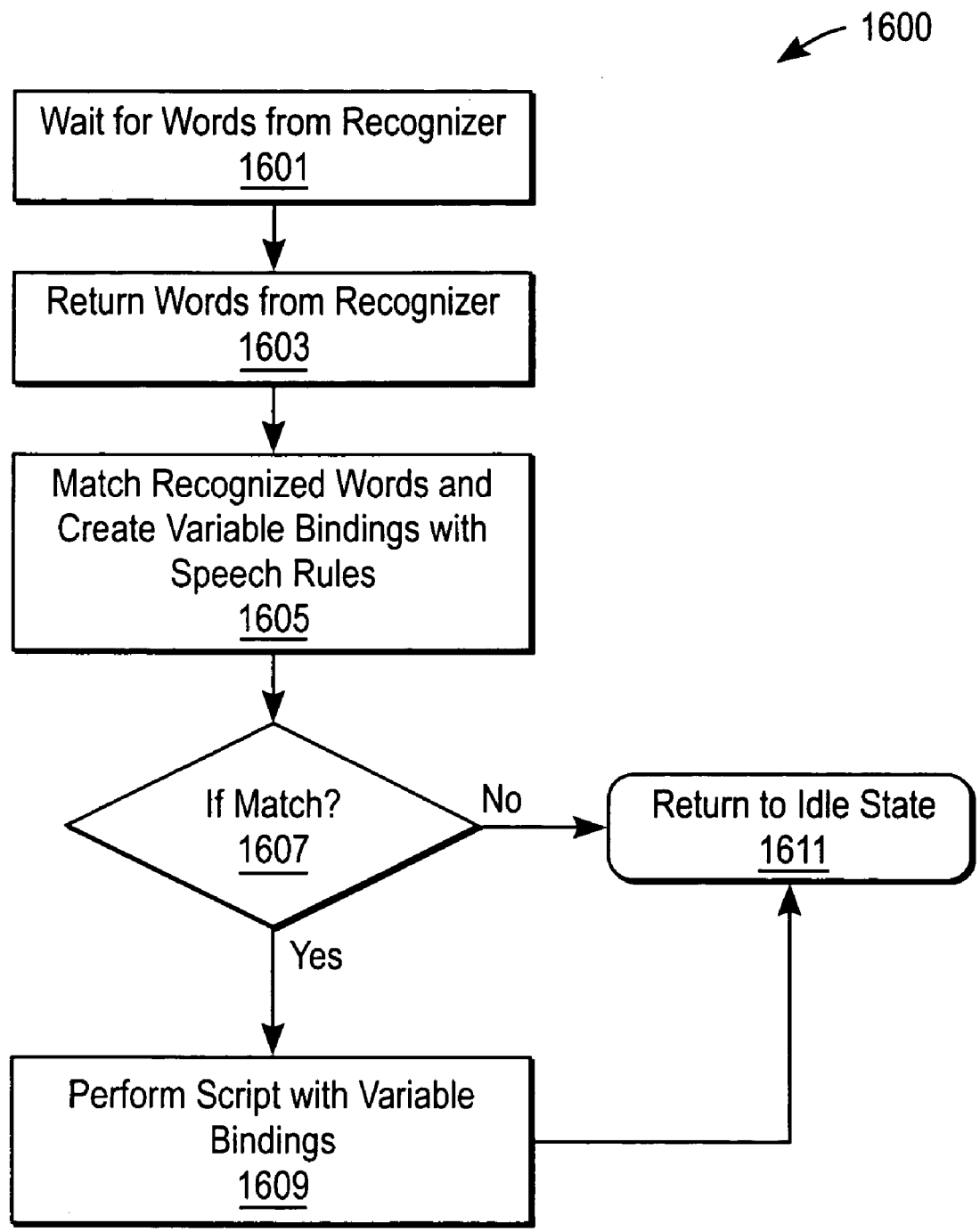

Process 1600 of FIG. 16 essentially shows rule interpretation which is performed by process 230 between times $t_4$ and $t_5$, as is shown in FIG. 3. At step 1601, process 1600 waits for words to be received from recognizer 220. Words are obtained at step 1603 from recognizer 220, and all speech rules which match the recognized utterance are determined at step 1605. This may be done using prior art matching and parsing techniques. The process of matching a speech rule to an utterance also produces a set of variable bindings, which represents the meaning of various phrases in the recognized utterance. At step 1607, it is determined whether any speech rules in the system has matched the user's utterance. If so, then interpreter 230 can perform the command script associated with the speech rule at step 1609 with the variable bindings which were determined at step 1605. In this manner, an appropriate action may be taken in the computer system in response to the user's command. After the script execution is finished, or if there was no matched speech rule, then, at step 1611, the system returns to an idle state (e.g., a state such as 1501 in FIG. 15 wherein language model generator 230 waits for additional speech to be received by the system).

Thus, a speech recognition system has been described. In the foregoing specification, the present invention has been described with reference to specific embodiments thereof shown in FIGS. 1 through 16. It will, however, be evident that various modifications and changes may be made thereto without departing from the broader spirit and scope of the present invention as set forth in the appended claims. The specification and drawings are, accordingly, to be regarded in an illustrative rather than a restrictive sense.

What is claimed is:

1. A computer implemented method comprising:
   determining a set of speech rules which match a spoken sequence of words by searching a current language model, said spoken sequence of words received through an audio input, said current language model generated from a plurality of speech rules according to a current operating context, wherein each of said plurality of speech rules comprises a language model and an expression; and
   evaluating said expressions in said current language model to assign a meaning to said spoken sequence of words.

2. The computer implemented method of claim 1 wherein each said expression comprises an arithmetic calculation for data that varies with operating context.

3. The computer implemented method of claim 1 wherein each said language model in each of said plurality of speech rules comprises recursive references to other language models.

4. The computer implemented method of claim 3 wherein each of said language models comprise expressions associated with each of said other language models.

5. The computer implemented method of claim 4 wherein said evaluation comprises evaluating each of said expressions for said other language models prior to evaluating each said language model in each speech rule of said set of speech rules.

6. The computer implemented method of claim 1 further comprising: generating said plurality of speech rules.

7. The computer implemented method of claim 1 further comprising:
   determining said current operating context; and
   generating said current language model.

8. The computer implemented method of claim 7, wherein determining said current operating context comprises determining a context for each executing application and a state for an operating system.

9. The computer implemented method of claim 1, wherein said plurality of speech rules comprises dynamic category speech rules and command speech rules, wherein each dynamic category speech rule comprises an expression that is evaluated to generate a current language model and each command speech rule comprises an expression that is evaluated to assign a meaning to a spoken sequence of words.

10. An apparatus for associating meanings to utterances in a speech recognition system comprising:
    means for determining a set of said speech rules which match a spoken sequence of words by searching a current language model, said spoken sequence of words received through an audio input, said current language model generated from a plurality of speech rules according to a current operating context, wherein each of said plurality of speech rules comprises a language model and an expression; and
    means for evaluating said expressions in said current language model to determine a meaning for said spoken sequence of words.

11. A computer-readable storage medium having executable instructions that cause a processor to perform a method comprising:
    determining a set of speech rules that match a spoken sequence of words by searching a current language model, said spoken sequence of words received through an audio input, said current language model generated from a plurality of speech rules according to a current operating context, wherein each of said plurality of speech rules comprises a language model and an expression; and
    evaluating said expressions in said current language model to assign a meaning to said spoken sequence of words.

12. The computer-readable storage medium of claim 11 wherein each said expression comprises an arithmetic calculation for data that varies with operating context.

13. The computer-readable storage medium of claim 11 wherein each said language model in each of said plurality of speech rules comprises recursive references to other language models.

14. The computer-readable storage medium of claim 13 wherein each of said language models comprise expressions associated with each of said other language models.

15. The computer-readable storage medium of claim 14 wherein said evaluation comprises evaluating each of said expressions for said other language models prior to evaluating each said language model in each speech rule of said set of speech rules.

16. The computer-readable storage medium of claim 11 further comprising:
    determining said current operating context; and
    generating said current language model.

17. The computer-readable medium of claim 16, wherein determining said current operating context comprises determining a context for each executing application and a state for an operating system.

18. The computer-readable medium of claim 11, wherein said plurality of speech rules comprises dynamic category speech rules and command speech rules, wherein each dynamic category speech rule comprises an expression that is evaluated to generate a current language model and each command speech rule comprises an expression that is evaluated to assign a meaning to a spoken sequence of words.

19. The computer-readable medium of claim 11 further comprising:
    generating said plurality of speech rules.

20. A computer implemented method comprising:
    determining a current operating context; and
    generating a current language model from a plurality of speech rules according to said current operating context to define a vocabulary for a spoken sequence of words received through an audio input, wherein each of said plurality of speech rules comprises a language model and an expression.

21. The computer implemented method of claim 20, wherein determining said current operating context comprises determining a context for each executing application and a state for an operating system.

22. The computer implemented method of claim 20, wherein said plurality of speech rules comprises dynamic category speech rules and command speech rules, wherein each dynamic category speech rule comprises an expression that is evaluated to generate a current language model and each command speech rule comprises an expression that is evaluated to interpret a spoken sequence of words.

23. The computer implemented method of claim 20 further comprising:
    transmitting said current language model to a speech recognition process.

24. An apparatus comprising:
    means for determining a current operating context; and
    means for generating a current language model from a plurality of speech rules according to said current operating context to define a vocabulary for a spoken sequence of words received through an audio input, wherein each of said plurality of speech rules comprises a language model and an expression.

25. A computer-readable storage medium having executable instructions that cause a processor to perform a method comprising:
    determining a current operating context; and
    generating a current language model from a plurality of speech rules according to said current operating context to define a vocabulary for a spoken sequence of words received through an audio input, wherein each of said plurality of speech rules comprises a language model and an expression.

26. The computer-readable storage medium of claim 25, wherein determining said current operating context comprises determining a context for each executing application and a state for an operating system.

27. The computer-readable storage medium of claim 25, wherein said plurality of speech rules comprises dynamic category speech rules and command speech rules, wherein each dynamic category speech rule comprises an expression that is evaluated to generate a current language model and each command speech rule comprises an expression that is evaluated to interpret a spoken sequence of words.

28. The computer-readable storage medium of claim 25 further comprising:

transmitting said current language model to a speech recognition process.

29. A computer system comprising: a processor coupled to a computer-readable storage medium having executable instructions that cause said processor to perform a method comprising:

determining a current operating context; and generating a current language model from a plurality of language rules according to said current operating context to define a vocabulary for a spoken sequence of words received through an audio input, wherein each of said plurality of language rules comprises a language model and an expression.

* * * * *